(12) United States Patent
Moriya et al.

(10) Patent No.: US 8,582,922 B2
(45) Date of Patent: Nov. 12, 2013

(54) IMAGE PROCESSING DEVICE AND METHOD

(75) Inventors: Shotaro Moriya, Tokyo (JP); Satoshi Yamanaka, Tokyo (JP); Hidetsugu Suginohara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 325 days.

(21) Appl. No.: 13/187,969

(22) Filed: Jul. 21, 2011

(65) Prior Publication Data

US 2012/0121208 A1 May 17, 2012

(30) Foreign Application Priority Data

Nov. 11, 2010 (JP) ................................ 2010-252790

(51) Int. Cl.
*G06K 9/32* (2006.01)
*G09G 5/02* (2006.01)
*H04N 11/20* (2006.01)
*H04N 7/01* (2006.01)
*H04N 1/46* (2006.01)

(52) U.S. Cl.
USPC ........... 382/299; 382/300; 345/698; 348/441; 358/525

(58) Field of Classification Search
None
See application file for complete search history.

(56) References Cited

U.S. PATENT DOCUMENTS

| | | | | |
|---|---|---|---|---|
| 5,696,848 A * | 12/1997 | Patti et al. | | 382/254 |
| 6,434,279 B1 | 8/2002 | Shiba | | |
| 7,218,796 B2 * | 5/2007 | Bishop et al. | | 382/299 |
| 7,630,672 B2 * | 12/2009 | Baretsky et al. | | 399/301 |
| 7,826,095 B2 * | 11/2010 | Wang et al. | | 358/3.01 |
| 7,961,985 B2 * | 6/2011 | Aiso | | 382/299 |
| 8,111,947 B2 * | 2/2012 | Sato et al. | | 382/294 |
| 8,274,717 B2 * | 9/2012 | McElvain et al. | | 358/515 |
| 2005/0157940 A1 * | 7/2005 | Hosoda et al. | | 382/266 |
| 2006/0159369 A1 * | 7/2006 | Young | | 382/299 |
| 2007/0071362 A1 * | 3/2007 | Milanfar et al. | | 382/299 |
| 2007/0098301 A1 * | 5/2007 | Rengakuji et al. | | 382/300 |
| 2009/0074328 A1 * | 3/2009 | Matsumoto et al. | | 382/300 |
| 2010/0150474 A1 * | 6/2010 | Aiso | | 382/284 |
| 2011/0110608 A1 * | 5/2011 | Jung et al. | | 382/299 |
| 2013/0038758 A1 * | 2/2013 | Imade | | 348/231.99 |

FOREIGN PATENT DOCUMENTS

| | | | |
|---|---|---|---|
| JP | 2897772 B1 | 5/1999 | |
| JP | 4496883 B2 | 7/2010 | |

\* cited by examiner

*Primary Examiner* — Randolph I Chu
(74) *Attorney, Agent, or Firm* — Birch, Stewart, Kolasch & Birch, LLP

(57) ABSTRACT

To obtain a high resolution image from two or more low resolution images, positional offsets among the low resolution images are determined and the low resolution images are mapped onto a common plane according to the positional offsets. Pixel values in the high resolution image are calculated by weighted interpolation from the pixel values of the low resolution images, using interpolation coefficients that increases with increasing correlation with the pixel of interest. Correlation is determined by taking horizontal and vertical first and second derivatives of the pixel values in one low resolution image to find a direction of strong correlation. Appropriate interpolation is thereby obtained even near edges and other abrupt changes in the image.

12 Claims, 10 Drawing Sheets

IMAGE PROCESSING DEVICE AND METHOD

BACKGROUND OF THE INVENTION

1. Field of the Invention

The present invention relates to an image processing apparatus and method.

2. Description of the Related Art

Processing a plurality of input images to generate a single output image is a known art. Among the image processing devices that generate a single output image from a plurality of input images, the image processing device described in patent document 1, for example, uses a function that is monotonically decreasing with respect to a distance from a position (I', J') to derive weighting coefficients for interpolation such that when a pixel value is calculated for position (I', J'), it will be more strongly influenced by pixels in closer positions.

Patent document 1: Japanese patent No. 4496883 (paragraphs 0144, 0148, 0149)

Patent document 2: Japanese patent No. 2897772

When a pixel value for position (I', J') is calculated by interpolation using weighting coefficients derived by using a function that is monotonically decreasing with respect to the distance from the position (I', J') such that the interpolated pixel value will be more strongly influenced by pixels in closer positions, inappropriate pixel values may be obtained for some images.

Particularly when there are portions such as edges at which the luminance changes greatly near position (I', J'), the interpolation results become inappropriate, causing distracting changes in luminance value in the output image.

SUMMARY OF THE INVENTION

According to one aspect of the invention, there is provided an
image processing device for generating a high resolution image from first to N-th low resolution images, where N is an integer equal to or greater than two. The image processing device includes:

a positional offset calculator for calculating a positional offset between the first low resolution image and each J-th low resolution image, where J is an integer ranging from two to N;

a combiner for obtaining a combined pixel array in which pixel values of pixels in the first to N-th low resolution images are assigned to pixels arrayed on a common plane on the basis of the positional offsets, and obtaining valid pixel flag data indicating whether or not each pixel on the common plane has been assigned a pixel value from the first to N-th low resolution images; and a pixel value calculator for obtaining a pixel value of each pixel in the high resolution image from an interpolation operation based on the pixel values of the pixels in the combined pixel array, using, for each pixel of interest set on the common plane, pixel values of pixels in an area of interest set to include the pixel of interest.

The pixel value calculator includes:

an interpolation coefficient calculator for obtaining, for the pixels in the area of interest, interpolation coefficients with values that increase with increasingly strong correlation with the pixel of interest; and an interpolation operation unit for performing the interpolation operation by using the interpolation coefficients and the pixel values of the pixels in the area of interest.

According to another aspect of the invention, there is provided an image processing method for generating a high resolution image from first to N-th low resolution images, where N is an integer equal to or greater than two. The image processing method includes:

a positional offset calculation step for calculating a positional offset between the first low resolution image and each J-th low resolution image, where J is an integer ranging from two to N;

a combining step for obtaining a combined pixel array in which pixel values of pixels in the first to N-th low resolution images are assigned to pixels arrayed on a common plane on the basis of the positional offsets, and obtaining valid pixel flag data indicating whether or not each pixel on the common plane has been assigned a pixel value from the first to N-th low resolution images; and a pixel value calculation step for obtaining a pixel value of each pixel in the high resolution image from an interpolation operation based on the pixel values of the pixels in the combined pixel array, using, for each pixel of interest set on the common plane, pixel values of pixels in an area of interest set to include the pixel of interest;

wherein the pixel value calculation step includes
an interpolation coefficient calculation step for obtaining, for the pixels in the area of interest, interpolation coefficients with values that increase with increasingly strong correlation with the pixel of interest; and an interpolation operation step for performing the interpolation operation by using the interpolation coefficients and the pixel values of the pixels in the area of interest.

The present invention does not produce inappropriate interpolation results even when there are portions such as edges at which the luminance value changes greatly, and does not cause distracting variations in luminance values in the output image.

DETAILED DESCRIPTION OF THE INVENTION

First Embodiment

Figure 1:
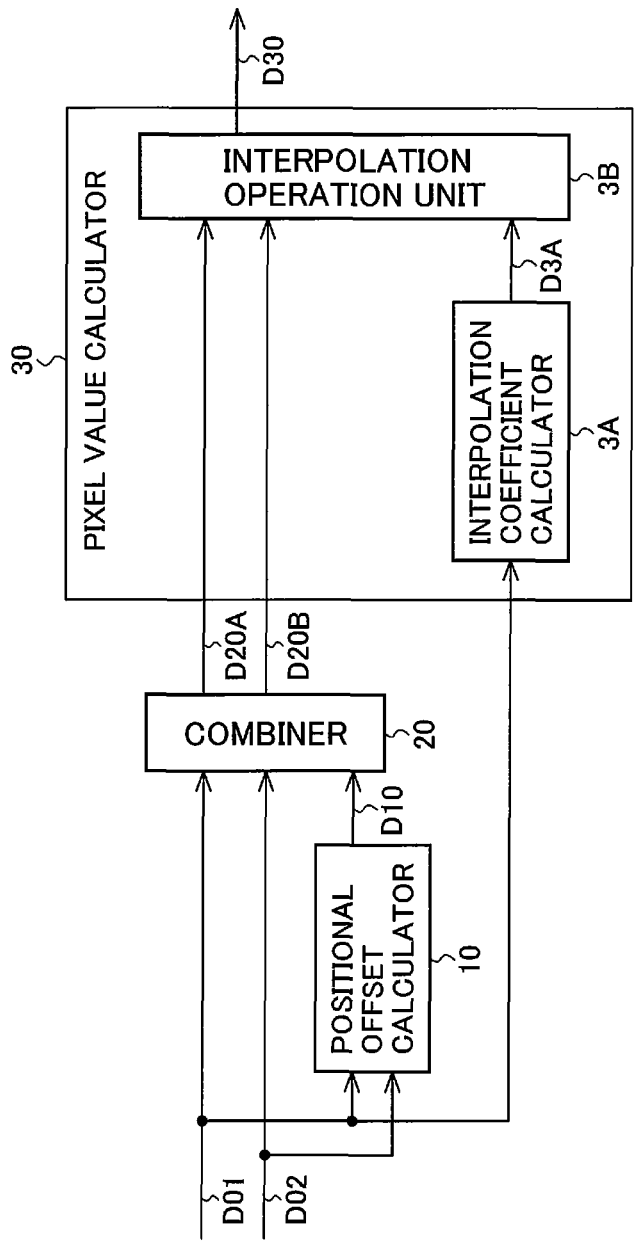
FIG. 1 is a block diagram showing an image processing device according to a first embodiment of the invention.

FIG. 1 is a block diagram showing an image processing device according to a first embodiment of the invention. The image processing device according to the first embodiment includes a positional offset calculator 10, a combiner 20, and a pixel value calculator 30. The inputs of the image processing device according to the first embodiment are a plurality of, e.g., two, low resolution images, and its output is a single high resolution image. The input images indicated in FIG. 1 are a first low resolution image D01 and a second low resolution image D02, and the output image is a high resolution image D30.

Figure 2:
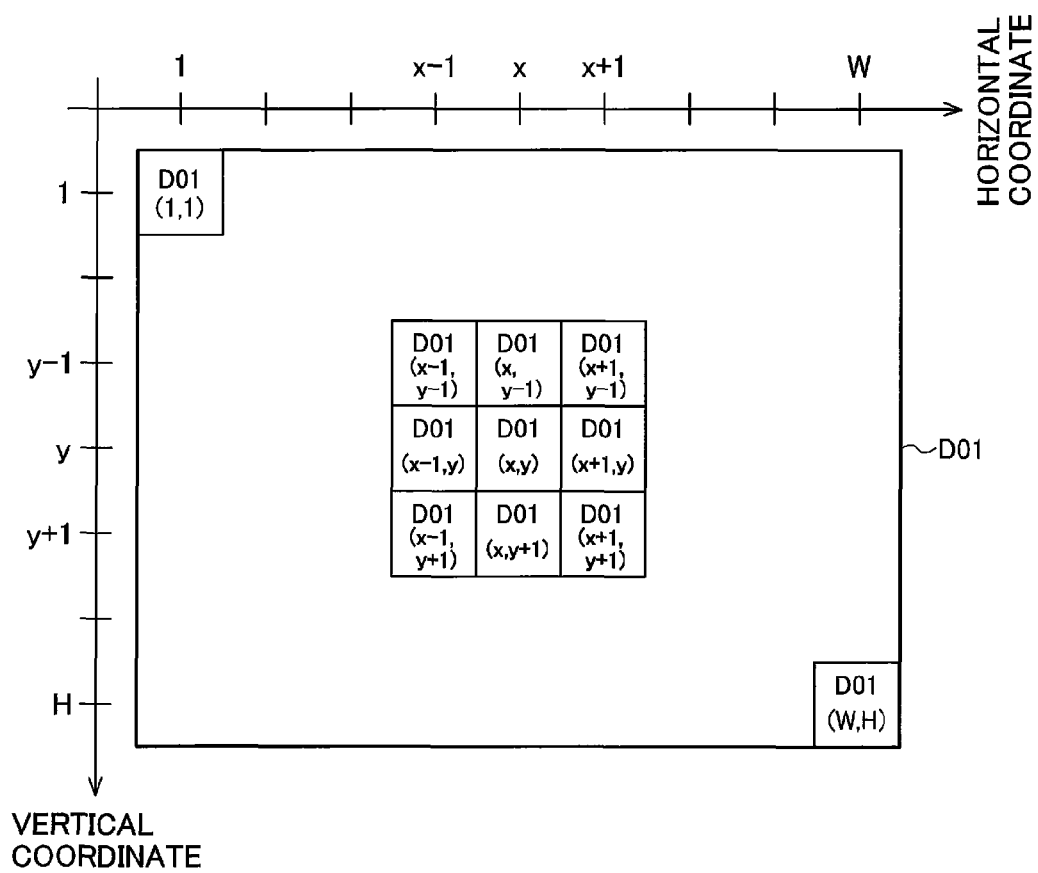
FIG. 2 schematically illustrates the arrangement of pixels in a low resolution image D01.

FIG. 2 represents the first low resolution image D01 schematically by showing some of the constituent pixels of the low resolution image D01. The smallest squares in FIG. 2 represent pixels. Horizontal coordinates and vertical coordinates are defined in accordance with the horizontal and vertical directions in low resolution image D01; the pixel value of the pixel in the position with a horizontal coordinate expressed as x and a vertical coordinate expressed as y is denoted $D01(x, y)$. The intervals between the scale marks on the coordinate axes are equal to the intervals between the pixels constituting input image D0. In the example shown in FIG. 2, low resolution image D01 is W pixels wide horizontally and H pixels high vertically.

Figure 3:
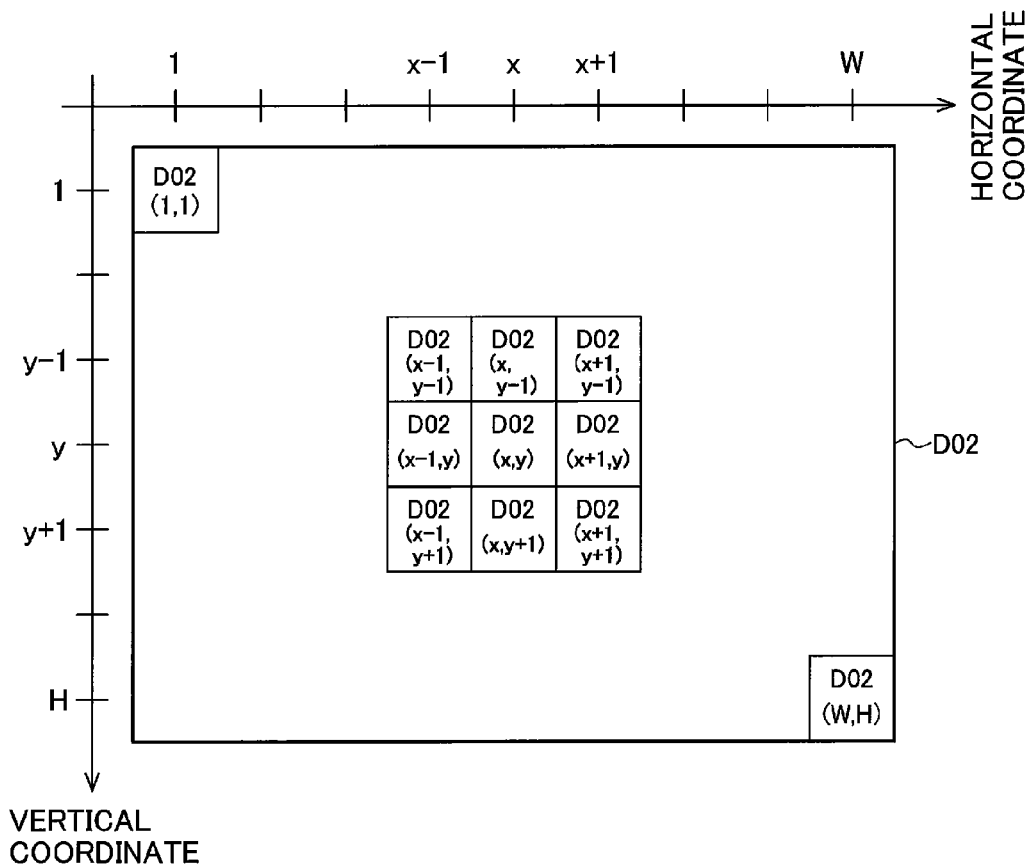
FIG. 3 schematically illustrates the arrangement of pixels in another low resolution image D02.

FIG. 3 represents the second low resolution image D02 schematically by showing some of the constituent pixels of the low resolution image D02. The notation is the same as in FIG. 2 so a detailed explanation will be omitted, except to note that the pixel value of the pixel in the position with a horizontal coordinate expressed as x and a vertical coordinate expressed as y is denoted $D02(x, y)$. The number of pixels in low resolution image D02 is the same as in low resolution image D01 in both the horizontal and vertical directions.

The operation of the image processing device according to the first embodiment and each of its component elements will be described below.

The positional offset calculator 10 calculates the positional offset of low resolution image D02 with respect to low resolution image D01, and outputs the calculated result as a positional offset D10. The positional offset D10 obtained here is a quantity, generally referred to as a motion vector, representing the amount by which low resolution image D02 has moved with respect to low resolution image D01. In the examples that follow, the motion vector or positional offset D10 is a two-dimensional vector. That is, it is a quantity representing the positional offset of low resolution image D02 with respect to low resolution image D01 in the horizontal and vertical directions.

The positional offset D10 is derived in subpixel units. That is, the positional offset D10 is calculated in minimum distance units shorter than the intervals between the pixels in low resolution image D01 or D02. In the detailed examples given below, the minimum unit is 0.25 times the pixel-to-pixel intervals in low resolution images D01 and D02. This type of positional offset D10 can be calculated by known methods such as the phase correlation method or the method described in patent document 2.

The combiner 20 outputs a combined pixel array D20A and valid pixel flag data D20B obtained as a result of combining low resolution images D01 and D02 on the basis of the positional offset D10. At this point the low resolution images D01 and D02 are combined in subpixel units.

First, the manner in which the combined pixel array D20A is derived will be described.

Figure 4:
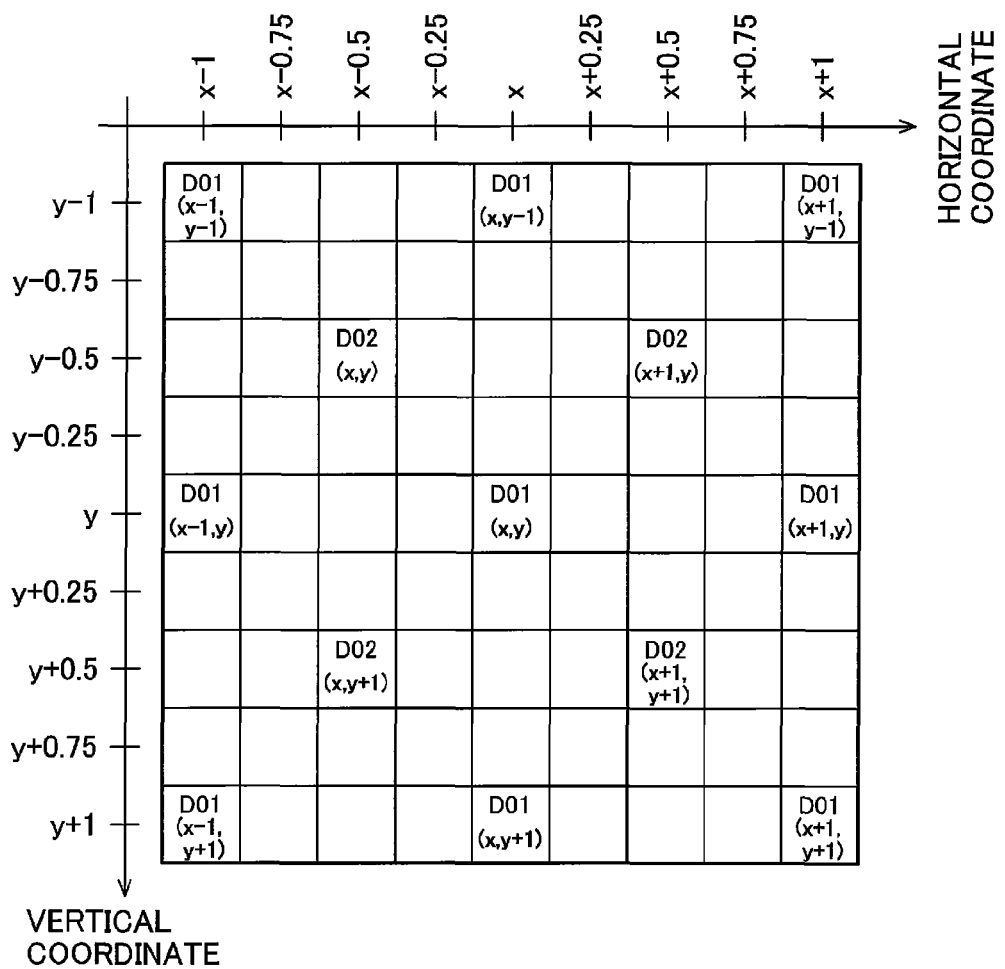
FIG. 4 schematically illustrates part of an exemplary combined pixel array D20A obtained by the combiner 20 in FIG. 1.
Figure 5:
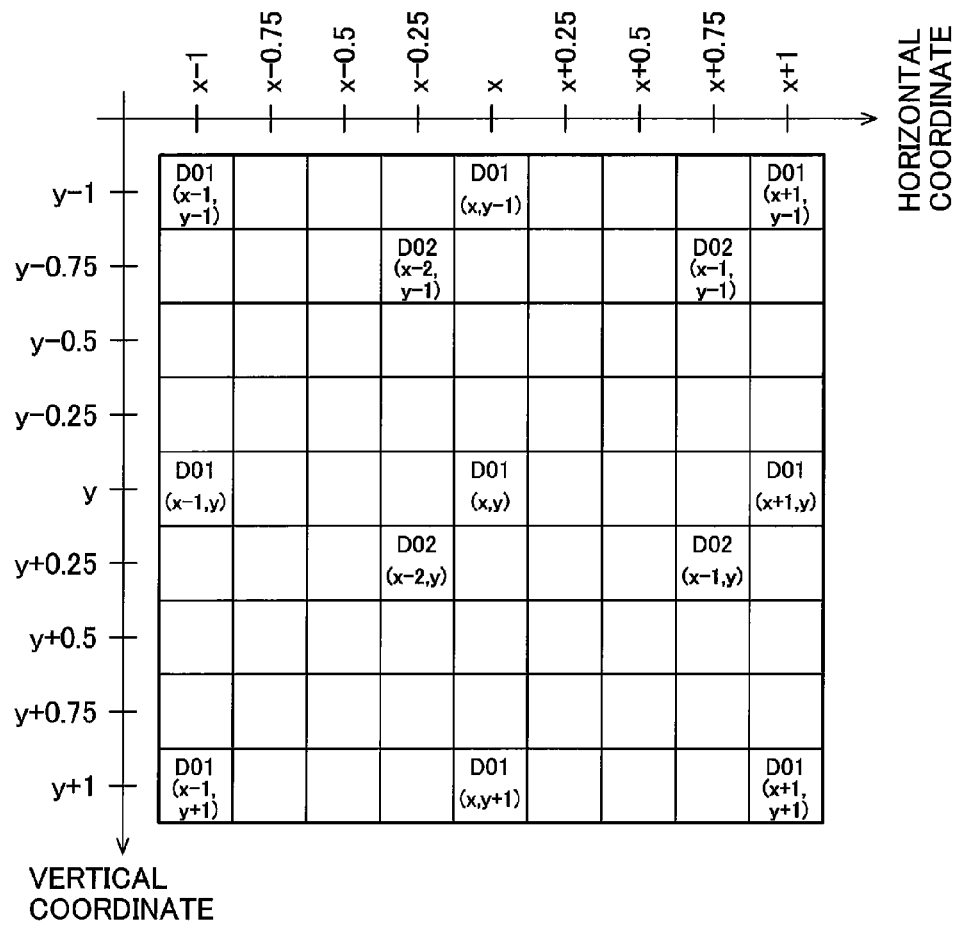
FIG. 5 schematically illustrates part of another exemplary combined pixel array D20A obtained by the combiner 20 in FIG. 1.

FIGS. 4 and 5 schematically illustrate different examples of combined pixel arrays D20A derived by the combiner 20.

Like the low resolution images D01 and D02, the combined pixel array D20A can be represented by pixel values given to pixels arrayed in a coordinate plane with a horizontal coordinate axis and a vertical coordinate axis. In other words, the combined pixel array D20A comprises an array of pixels on the coordinate plane.

The length of a change of 1 in the coordinate values x, y on the horizontal and vertical coordinate axes is the same as on the coordinate axes shown in FIGS. 2 and 3. This implies that the low resolution images D01 and D02 and the combined pixel array D20A can be represented on the same coordinate plane. The smallest squares in FIGS. 4 and 5 represent pixels in the combined pixel array; the pixel intervals in the combined pixel array are 0.25 times the pixel intervals in the low resolution images D01, D02 shown in FIGS. 2 and 3. Thus the pixel at a position represented by coordinates (x, y), for example, has a size that fits horizontally within the range from x−0.125 to x+0.125 and vertically within the range from y−0.125 to y+0.125.

FIG. 4 schematically illustrates a combined pixel array D20A obtained when the positional offset calculator 10 decides that low resolution image D02 is offset by 0.5 pixel to the right horizontally and 0.5 pixel downward vertically with respect to low resolution image D01.

In this case, the combined pixel array D20A is formed by shifting low resolution image D02 by 0.5 pixel to the left horizontally and 0.5 pixel upward vertically with respect to low resolution image D01, in order to cancel the offset.

The pixels constituting the combined pixel array D20A are made to have pixels value of the pixels in low resolution image D01 and low resolution image D02 having been shifted as described above. First, the pixel value $D01(x, y)$ of the pixel located at the position represented by horizontal coordinate x and vertical coordinate y in low resolution image D01 is assigned to the pixel located at the position represented by horizontal coordinate x and vertical coordinate y on the coordinate plane representing the combined pixel array D20A as its pixel value. Next, the pixel value $D02(x, y)$ of the pixel located at the position represented by horizontal coordinate x and vertical coordinate y in low resolution image D02 is assigned to the pixel located at the position represented by horizontal coordinate x−0.5 and vertical coordinate y−0.5 on the coordinate plane representing the combined pixel array D20A as its pixel value.

FIG. 5 schematically illustrates a combined pixel array D20A obtained when the positional offset calculator 10 decides that low resolution image D20 is offset by 1.75 pixels to the left horizontally and 0.25 pixel upward vertically with respect to low resolution image D01.

In this case, the combined pixel array D20A is formed by shifting low resolution image D02 by 1.75 pixel to the right horizontally and 0.25 pixel downward vertically with respect to low resolution image D01, in order to cancel the offset.

The pixels constituting the combined pixel array D20A are made to have pixels value of the pixels in low resolution image D01 and low resolution image D02 having been shifted as described above. First, the pixel value $D01(x, y)$ of the pixel located at the position represented by horizontal coordinate x and vertical coordinate y in low resolution image D01 is assigned to the pixel located at the position represented by horizontal coordinate x and vertical coordinate y on the coordinate plane representing the combined pixel array D20A as its pixel value. Next, the pixel value D02(x, y) of the pixel located at the position represented by horizontal coordinate x and vertical coordinate y in low resolution image D02 is assigned to the pixel located at the position represented by horizontal coordinate x+1.75 and vertical coordinate y+0.25 on the coordinate plane representing the combined pixel array D20A as its pixel value.

As is clear from the preceding description, there are some pixels in the combined pixel array D20A to which neither pixel values of pixels in low resolution image D01 nor pixel values of pixels in low resolution image D02 are assigned. In the examples shown in FIGS. 4 and 5, the pixels to which neither pixel values of pixels in low resolution image D01 nor pixel values of pixels in low resolution image D02 are assigned include, among others, the pixels represented by horizontal coordinate x and vertical coordinate y+0.5 and the pixels represented by horizontal coordinate x+0.25 and vertical coordinate y+0.25.

If low resolution image D02 is not offset with respect to low resolution image D01, either of the pixels of low resolution image D01 and the pixels of low resolution image D02 may be used as the pixels in the combined pixel array D20. Specifically, either one the pixel at a certain position (x, y) in low resolution image D01 and the pixel at the corresponding position (x, y) in low resolution image D02 may be assigned to the pixel at the corresponding position (x, y) in the combined pixel array D20. Alternatively, an average, such as a weighted average or a simple average, of the pixel at a position (x, y) in low resolution image D01 and the pixel at the corresponding position (x, y) in low resolution image D02 may be assigned to the pixel at the corresponding position (x, y) in the combined pixel array D20.

Next, the way in which the valid pixel flag data D20B are obtained will be described.

As the valid pixel flag data D20B, a flag value of '1' or '0' is assigned to each pixel in the combined pixel array D20A. Specifically, flag values of '1' are assigned as the valid pixel data D20B to those pixels in the combined pixel array D20A to which pixel values from the pixels constituting the low resolution images D01, D02 are assigned, and flag values of '0' are assigned to those pixels to which no pixel value is assigned from either of the low resolution images D01, D02.

The pixel value calculator 30, which includes an interpolation coefficient calculator 3A and an interpolation operation unit 3B, obtains the pixel values of the pixels in the high resolution image D30 by performing interpolation operations. The pixel value at a position of interest, which is a position occupied by a pixel of the high resolution image D30 when the high resolution image D30 is overlaid on the plane representing the combined pixel array D20A is interpolated by a calculation using the pixel values of the pixels in the combined pixel array D20A that are located in an area of interest set so as to include the position of interest.

If a pixel of the high resolution image D30 is located at a position with horizontal coordinate s and vertical coordinate t on the coordinate plane representing the combined pixel array D20A, its pixel value will be denoted D30(s, t) below. When coordinate values such as horizontal coordinates and vertical coordinates are given in the description below, the coordinate values will implicitly apply to the coordinate plane representing the combined pixel array D20A.

The positions of interest on which the pixels of high resolution image D30 are located when high resolution image D30 is overlaid on the coordinate plane representing combined pixel array D20A can be found from the ratio of the number of pixels in low resolution image D01 to the number of pixels in high resolution image D30. If high resolution image D30 has U pixels horizontally and V pixels vertically, then the horizontal coordinates s of the positions of interest can be expressed by the following equation (1), using a variable i that takes integer values from 1 to U, $$s = 1 + (i-1) \times \frac{W}{U} \qquad (1)$$

and the vertical coordinates t of the positions of interest can be expressed by the following equation (2), using a variable j that takes integer values from 1 to V.

$$t = 1 + (j-1) \times \frac{H}{V} \qquad (2)$$

If, for example, the high resolution image D30 has twice as many pixels in both the horizontal and vertical directions as the low resolution image D01, then U=2W and V=2H, and the positions of interest on the plane representing the combined pixel array D20A are the positions with coordinates expressed by horizontal coordinate values of the form 1+(i−1)×0.5 and vertical coordinate values of the form 1+(j−1)×0.5. In the example of the plane representing the combined pixel array D20A shown in FIG. 4 or 5, the pixel value calculator 30 obtains pixel values such as D30(x, y), D30(x+0.5, y), D30(x, y+0.5), and D30(x+0.5+0.5, y).

That is, s is a discrete value with units equal to W/U times, e.g., 0.5 times, the pixel pitch in the low resolution images and t is a discrete value with units equal to H/V times, e.g., 0.5 times, the pixel pitch in the low resolution images.

The interpolation coefficient calculator 3A and interpolation operation unit 3B will now be described.

First, the operation and configuration of the interpolation coefficient calculator 3A will be described. As described in detail below, the interpolation coefficient calculator 3A obtains interpolation coefficients D3A that have greater values for those of the pixels that are more strongly correlated with the pixel of interest, among the pixels in the area of interest, treating the pixels located in a direction of strong correlation as the strongly correlated pixels. In the example described below, the direction of strong correlation is found from the first low resolution image D01, but it may be found from the second low resolution image D02 instead.

Figure 6:
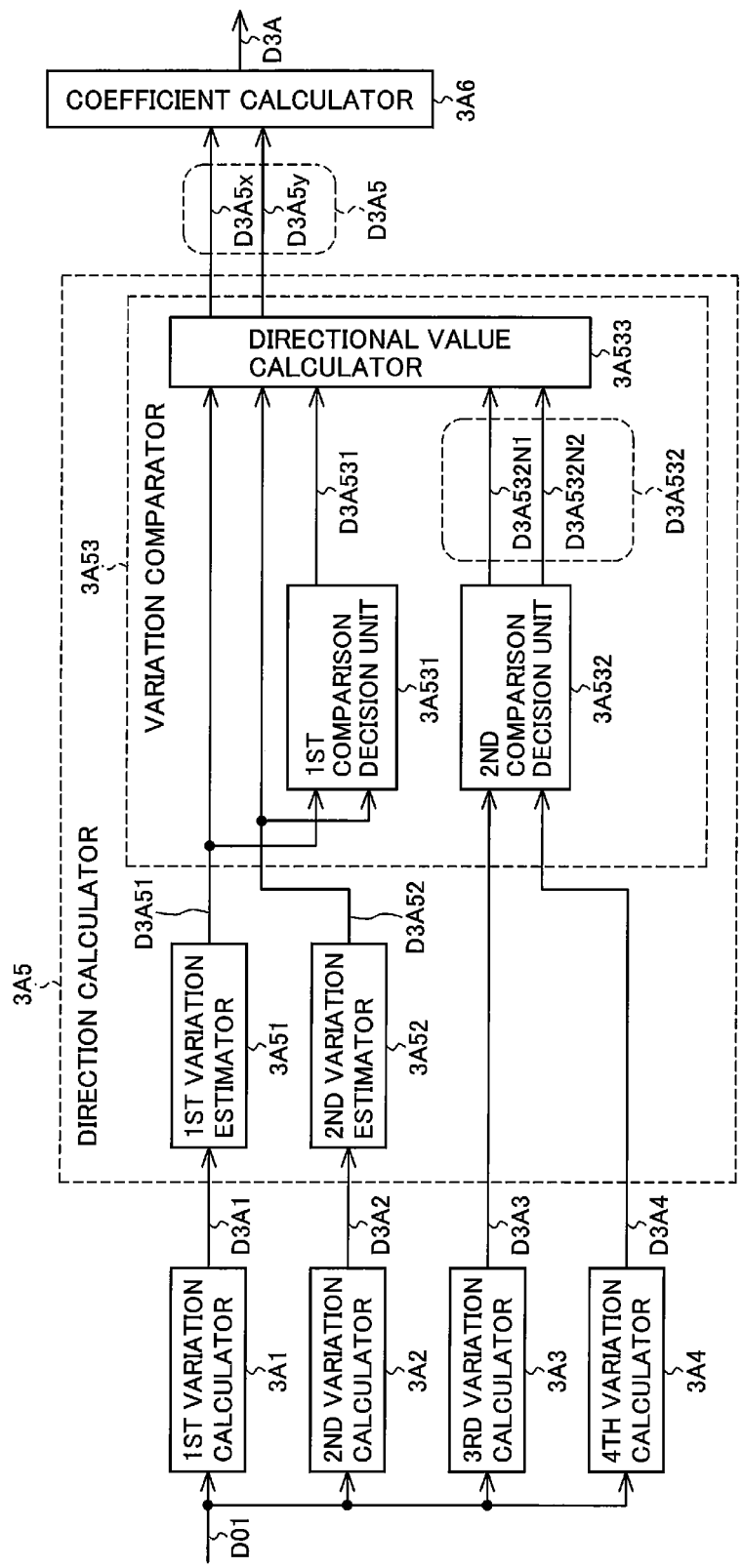
FIG. 6 is a block diagram showing an example of the structure of the interpolation coefficient calculator 3A in FIG. 1.

FIG. 6 shows an example of the configuration of the interpolation coefficient calculator 3A. The interpolation coefficient calculator 3A includes a first variation calculator 3A1, a second variation calculator 3A2, a third variation calculator 3A3, a fourth variation calculator 3A4, a direction calculator 3A5, and a coefficient calculator 3A6.

For each pixel in low resolution image D01, the first variation calculator 3A1 calculates a first derivative (first-order derivative) of related pixel values in the horizontal direction and outputs the calculated result as a first variation quantity D3A1. The first derivative D3A1(x, y) in the horizontal direction obtained for the pixel represented by horizontal coordinate x and vertical coordinate y in FIG. 2 is calculated by the following equation (3).

$$D3A1(x, y) = \frac{D01(x+1, y) - D01(x-1, y)}{2} \quad (3)$$

For each pixel in low resolution image D01, the second variation calculator 3A2 calculates a first derivative of related pixel values in the vertical direction and outputs the calculated result as a second variation quantity D3A2. The first derivative D3A2(x, y) in the vertical direction obtained for the pixel represented by horizontal coordinate x and vertical coordinate y in FIG. 2 is calculated by the following equation (4).

$$D3A2(x, y) = \frac{D01(x, y+1) - D01(x, y-1)}{2} \quad (4)$$

For each pixel in low resolution image D01, the third variation calculator 3A3 calculates a second derivative (second-order derivative) of related pixel values in the horizontal direction and outputs the calculated results as a third variation quantity D3A3. The second derivative D3A3(x, y) in the horizontal direction obtained for the pixel represented by horizontal coordinate x and vertical coordinate y in FIG. 2 is calculated by the following equation (5).

$$D3A3(x,y)=D01(x+1,y)-2 \times D01(x,y)+D01(x-1,y) \quad (5)$$

For each pixel in low resolution image D01, the fourth variation calculator 3A4 calculates a second derivative of related pixel values in the vertical direction and outputs the calculated result as a fourth variation quantity D3A4. The second derivative D3A4(x, y) in the vertical direction obtained for the pixel represented by horizontal coordinate x and vertical coordinate y in FIG. 2 is calculated by the following equation (6).

$$D3A4(x,y)=D01(x,y+1)-2 \times D01(x,y)+D01(x,y-1) \quad (6)$$

From the first, second, third, and fourth variation quantities D3A1, D3A2, D3A3, D3A4, the direction calculator 3A5 obtains directional data D3A5 indicating the direction of strong correlation, centered at the position of interest. The direction of strong correlation with the position of interest refers to a direction in which lie pixels having pixel values close to the pixel value to be calculated for a pixel assumed to exist at the position of interest.

As shown in FIG. 6, the direction calculator 3A5 includes a first variation estimator 3A51, a second variation estimator 3A52, and a variation comparator 3A53.

The first variation estimator 3A51 estimates a first variation quantity at the position of interest from the first variation quantities D3A1 obtained for the pixels in the first low resolution image D01 located in a neighborhood of the position of interest, and outputs the result as a first estimated variation quantity D3A51.

This estimated variation quantity D3A51 is estimated by use of, for example, linear interpolation. In this case, if the position of interest has horizontal coordinate s and vertical coordinate t, and the value of the estimated variation quantity D3A51 at this position is denoted D3A51(s, t), the estimated variation quantity D3A51(s, t) is given by the following equation (7), in which sdec and tdec are the fraction parts of the coordinate values s and t, respectively.

$$D3A51(s,t)=(1-t\text{dec})\cdot((1-s\text{dec})\cdot D3A1(s-s\text{dec},t-t\text{dec})+ \\ s\text{dec}\cdot D3A1(s-s\text{dec}+1,t-t\text{dec}))+t\text{dec}\cdot((1-s\text{dec}) \\ \cdot D3A1(s-s\text{dec},t-t\text{dec}+1)+s\text{dec}\cdot D3A1(s-s\text{dec}+1,t- \\ t\text{dec}+1)) \quad (7)$$

The second variation estimator 3A52 estimates a second variation quantity at the position of interest from the second variation quantities D3A2 obtained for the pixels in the first low resolution image D01 located in a neighborhood of the position of interest, and outputs the result as a second estimated variation quantity D3A52.

This estimated variation quantity D3A52 is estimated by use of, for example, linear interpolation. In this case, if the position of interest has horizontal coordinate s and vertical coordinate t, and the value of the estimated variation quantity D3A52 at this position is denoted D3A52(s, t), the estimated variation quantity D3A52(s, t) is given by the following equation (8).

$$D3A52(s,t)=(1-t\text{dec})\cdot((1-s\text{dec})\cdot D3A2(s-s\text{dec},t-t\text{dec})+ \\ s\text{dec}\cdot D3A2(s-s\text{dec}+1,t-t\text{dec}))+t\text{dec}\cdot((1-s\text{dec}) \\ \cdot D3A2(s-s\text{dec},t-t\text{dec}+1)+s\text{dec}\cdot D3A2(s-s\text{dec}+1,t- \\ t\text{dec}+1)) \quad (8)$$

When these estimated variation quantities D3A51 and D3A52 are obtained by interpolation, they may also be referred to as interpolated variation quantities.

The variation comparator 3A53 determines and outputs directional data D3A5 based on the values of the first and second estimated variation quantities D3A51, D3A52, and the third and fourth variation quantities D3A3, D3A4. The directional data D3A5 are two-dimensional data including a first directional value D3A5x and a second directional value D3A5y.

As shown in FIG. 6, the variation comparator 3A53 includes a first comparison decision unit 3A531, a second comparison decision unit 3A532, and a directional value calculator 3A533.

The first comparison decision unit 3A531 outputs a first value (for example, '1') as a first comparison result D3A531 when the absolute value of the first estimated variation quantity D3A51 is greater than a first threshold value D3A51t and the absolute value of the second estimated variation quantity D3A52 is greater than a second threshold value D3A52t, and outputs a second value (for example, '0'), in other cases.

For each pixel in the first low resolution image D01 located in a neighborhood of the position of interest, the second comparison decision unit 3A532 compares the magnitudes of the third variation quantity D3A3 and the fourth variation quantity D4A4 obtained for that pixel, outputs the number of pixels at which the absolute value of the third variation quantity D3A3 is greater than the absolute value of the fourth variation quantity D4A4 as a first count D3A532N1, and outputs the number of pixels at which the absolute value of the fourth variation quantity D4A4 is greater than the absolute value of the third variation quantity D3A3 as a second count D3A532N2. The data consisting of the first count D3A532N1 and second count D3A532N2 will be referred to as a second comparison result D3A532.

The directional value calculator 3A533 outputs the directional data D3A5. As noted above, the directional data D3A5 consist of two-dimensional values including the first directional value D3A5x and the second directional value D3A5y. The way in which the directional value calculator 3A533 derives the first directional value D3A5x and second directional value D3A5y will be described below.

When the first comparison result D3A531 has the first value ('1', indicating that the horizontal variation quantity output from the first variation calculator 3A1 and the vertical variation quantity output from the second variation calculator 3A2 are both large), the directional value calculator 3A533 calculates the first directional value D3A5x and second directional value D3A5y from the following equations (9).

$$D3A5x = D3A51/\sqrt{D3A51^2 + D3A52^2}$$

$$D3A5y = D3A52/\sqrt{D3A51^2 + D3A52^2} \quad (9)$$

When the first comparison result D3A531 has the second value ('0', indicating that the horizontal variation quantity output from the first variation calculator 3A1 or the vertical variation quantity output from the second variation calculator 3A2 is small), if the difference between the first count D3A532N1 and the second count D3A532N2 is less than a threshold value D3A532t, the directional value calculator 3A533 decides that there is no direction of strong correlation and calculates the first and second directional values D3A5x and D3A5y from the following equations (10), $$D3A5x = 0$$

$$D3A5y = 0 \quad (10)$$

whereas if the difference between the first count D3A532N1 and the second count D3A532N2 is equal to or greater than the threshold value D3A532t, the directional value calculator 3A533 decides the direction of strong correlation and calculates the first and second directional values D3A5x and D3A5y as follows. That is, if the first count D3A532N1 is greater than the second count D3A532N2, the directional value calculator 3A533 decides that there is strong correlation in the second direction, and calculates the first and second directional values D3A5x and D3A5y from the following equations (11), $$D3A5x = 1$$

$$D3A5y = 0 \quad (11)$$

whereas if the second count D3A532N2 is greater than the first count D3A532N1, the directional value calculator 3A533 decides that there is strong correlation in the first direction, and calculates the first and second directional values D3A5x and D3A5y from the following equations (12).

$$D3A5x = 0$$

$$D3A5y = 1 \quad (12)$$

From the directional data D3A5, the coefficient calculator 3A6 calculates and outputs an interpolation coefficient D3A for each pixel in the area of interest in the combined pixel array D20A. The interpolation coefficient D3A is calculated so that the pixels in the positions closer to a line extending in the direction determined to be of strong correlation (i.e., the pixels positioned in the directions closer to the direction determined to be of strong correlation) have greater values.

A specific example of the calculation of an interpolation coefficient D3A(p, q, s, t) is shown below, where D3A(p, q, s, t) denotes the interpolation coefficient D3A for the pixel in the position represented by horizontal coordinate p and vertical coordinate q among the pixels in the area of interest including a position of interest with horizontal coordinate s and vertical coordinate t in the combined pixel array D20A.

In the examples in FIGS. 4 and 5, p and q are discrete values with units of 0.25 pixel (0.25 times the interval between pixels in the low resolution images), and s and t are discrete values with respective units of W/U times, for example, 0.5 times, and H/U times, for example, 0.5 times the interval between pixels in the low resolution images, as noted above.

The interpolation coefficient D3A(p, q, s, t) is derived from a relation that is monotonically decreasing with respect to a quantity r given by the following equation (13).

$$r = |(p-s) \times D3A5x(s,t) + (q-t) \times D3A5y(s,t)| \quad (13)$$

That is, the interpolation coefficient D3A(p, q, s, t) is calculated by use of a function f(r) that is monotonically decreasing with respect to the variable r.

$$D3A(p, q, s, t) = f(r) \quad (14)$$
$$= f(|(p-s) \times D3A5x(s, t) + (q-t) \times D3A5y(s, t)|)$$

D3A5x(s, t) and D3A5y(s, t) in the above equation (14) are, respectively, the first directional value D3A5x and second directional value D3A5y calculated for the position of interest represented by horizontal coordinate s and vertical coordinate t.

The reason why the above method enables calculation of an interpolation coefficient D3A that has a greater value for the pixels in the positions closer to a line extending in the direction determined to be of strong correlation (i.e., the pixels positioned in the directions closer to the direction determined to be of strong correlation) will be given later.

The interpolation coefficient calculator 3A is configured and operates as described above.

Next the operation of the interpolation operation unit 3B will be described.

The interpolation operation unit 3B obtains the pixel value D30(s, t) by an interpolation operation. This interpolation operation is based on the pixel values D20A(p, q) of the pixels in the area of interest, the valid pixel flag data D20B(p, q) of the pixels in the area of interest, and the interpolation coefficients D3A(p, q, s, t) for the pixels in the area of interest for interpolation of the pixel of interest. The operation is expressed as, for example:

$$D30(s, t) = \frac{\sum_{p,q} D3A(p, q, s, t) \times D20A(p, q)}{\sum_{p,q} D3A(p, q, s, t) \times D20B(p, q)}. \quad (15)$$

In the above equation (15), D20A(p, q) represents the pixel value assigned to the pixel located at the position represented by horizontal coordinate p and vertical coordinate q among the pixels in the combined pixel array D20A, and D20B(p, q) represents the valid pixel flag data assigned to the pixel located at the position represented by horizontal coordinate p and vertical coordinate q among the pixels in the combined pixel array D20A.

The operation and effect of the image processing device according to the first embodiment will be described below.

First the estimated variation quantities D3A51 and D3A52 will be described. If the high resolution image D30 is represented as a curved surface in a coordinate space having an x axis representing the horizontal coordinates of the high resolution image D30, a y axis presenting the vertical coordinates of the high resolution image D30, and a z axis representing the luminance values of the high resolution image D30, then at each point on the curved surface representing the high resolution image D30, the two-dimensional vector having estimated variation quantity D3A51 as its first component and estimated variation quantity D3A52 as its second component is equivalent to the gradient.

The gradient of a curved surface will now be described. In general, a curved surface is defined as a function of two variables in a coordinate space with x, y, and z axes. If this function of two variables is written as z=f(x, y), the gradient of the curved surface is represented using partial derivatives by the following two-dimensional vector:

$$\left(\frac{\partial}{\partial x}f(x, y), \frac{\partial}{\partial y}f(x, y)\right) \quad (16)$$

This gradient can be calculated for each point on the curved surface z=f(x, y). The gradient calculated for each point on the curved surface z=f(x, y) is a vector indicating the direction orthogonal to the contour line passing through that point. The value taken by f(x, y) is the pixel value of the pixel at the position with horizontal coordinate x and vertical coordinate y.

If the two-dimensional vector (D3A1, D3A2) having the first variation quantity D3A1 given by equation (3) as its first component and the second variation quantity D3A2 given by equation (4) as its second component is considered, this two-dimensional vector is the gradient of the curved surface representing low resolution image D01.

When an image is represented by a curved surface, a contour line on the curved surface is a line passing through pixels with the same pixel value in the image. Accordingly, it can be considered that, in the direction orthogonal to the direction indicated by the gradient at a point on the curved surface representing the image, there should be a line of pixels with the same value as the pixel at the position at which the gradient was calculated.

From the above property, if the gradient at a point of interest on the curved surface representing the high resolution image D30 could be calculated, the resultant value could be used to determine a direction in which there is a line of pixels with values close to the pixel value calculated for the pixel at the position of interest, that is, a direction of strong correlation with the pixel of interest.

However, since most pixel values in the high resolution image D30 are unknown, the gradients are difficult to calculate. In the image processing device according to the first embodiment, accordingly, gradients in the high resolution image D30 are approximated by gradients in low resolution image D01. The reason why this approximation is possible will be described below.

In general, the values of pixels constituting an image vary smoothly. Accordingly, the function of two variables corresponding to an image can be considered as a continuous function having values that vary continuously and having first derivative values that also vary continuously. The first derivative values of the continuous function at an arbitrary point are approximately equal to values obtained by interpolation from first derivative values taken from a plurality of points near the arbitrary point. From this property and the fact that the gradient on the curved surface can be represented by the first derivatives of the function representing the curved surface, it is clear that the gradient at each point on the curved surface can also be approximated by the gradient obtained by interpolation from the gradients of a plurality of points located nearby.

If the high resolution image D30 and low resolution image D01 are compared, ignoring the difference in the numbers of pixels, the two images are the same, and the curved surfaces representing them in the coordinate space are substantially identical. Accordingly, the gradients of the high resolution image D30 can be approximated from the gradients of low resolution image D01 by interpolation as in equations (7) and (8).

Therefore, the two-dimensional vector having as its first and second components the estimated variation quantities D3A51 and D3A52 obtained by interpolation from the first and second variation quantities D3A1, D3A2 that represent the gradients of low resolution image D01 approximately represents the gradient of the high resolution image D30.

The two-dimensional vector having the first directional value D3A5$x$ and the second directional value D3A5$y$ as its first and second components will now be described.

The two-dimensional vector having the first directional value D3A5$x$ and second directional value D3A5$y$ expressed by equations (9) as its first and second components is a unit vector parallel to the two-dimensional vector having the first estimated variation quantity D3A51 as its first component and the second estimated variation quantity D3A52 as its second component, so that this vector points in the same direction as the gradient. Since the direction of strong correlation can be found from the gradient, the first and second directional values D3A5$x$, D3A5$y$, given by equations (9), can also be used to find the direction of strong correlation.

If the absolute value of at least one of the estimated variation quantities D3A51 and D3A52 is small, the first directional value D3A5$x$ and second directional value D3A5$y$ are obtained from a comparison of the third variation quantity D3A3 and fourth variation quantity D3A4. This produces the following effects.

Figure 7A:
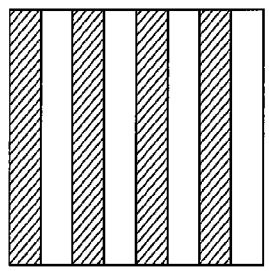
FIGS. 7A, 7B, and 7C show exemplary images in which the absolute value of at least one of the estimated variation quantities D3A51 and D3A52 is small.
Figure 7B:
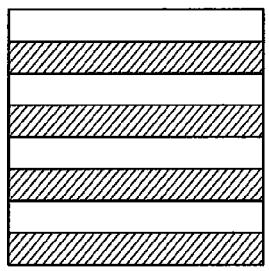
Figure 7C:
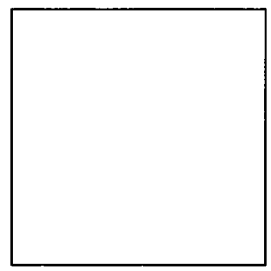

FIGS. 7A to 7C show three typical images in which the absolute value of at least one of the estimated variation quantities D3A51 and D3A52 is small: the image in FIG. 7A has a vertical stripe pattern; the image in FIG. 7B has a horizontal stripe pattern; the image in FIG. 7C has no visible changes in pixel values.

In an image with a vertical stripe pattern as in FIG. 7A, the absolute values of the second variation quantities D3A2 are not so large, so that the absolute values of the second estimated variation quantities D3A52 obtained by interpolation from the second variation quantities D3A2 are not so large either.

In an image with a horizontal stripe pattern as in FIG. 7B, the absolute values of the first variation quantities D3A1 are not so large, so that the absolute values of the first estimated variation quantities D3A51 obtained by interpolation from the first variation quantities D3A1 are not so large either.

In an image without changes in pixel values, as in FIG. 7C, neither the absolute values of the first variation quantities D3A1 nor the absolute values of the second variation quantities D3A2 are so large, so that the absolute values of both the first and second estimated variation quantities D3A51, D3A52 are not so large.

If low resolution image D01 includes a vertical stripe pattern as in FIG. 7A, the absolute values of the first derivatives of the pixel values in the horizontal direction can be expected to be fairly large. The first derivatives may take positive and negative values.

The first derivative calculated for a position of interest in the high resolution image D30 is given by interpolation from the first derivatives calculated for the pixels in low resolution image D01.

First, the interpolation of first derivatives in the horizontal direction by equation (7) will be described. For some spacing intervals between the stripes, the interpolating operation performed by equation (7) requires addition of a positive value and a negative value. For example, if D3A1($s$–sdec, t–tdec) and D3A1($s$–sdec, t–tdec+1) are positive values and D3A1($s$–sdec+1, t–tdec) and D3A1($s$–sdec+1, t–tdec+1) are negative values, the positive values offset the negative values, so that the first estimated variation quantity D3A5a obtained as a result of this interpolation operation may be a small value close to zero.

Next, the interpolation of first derivatives in the vertical direction in the image by equation (8) will be described. In this case, the absolute values of D3A2($s$–sdec, t–tdec), D3A2 ($s$–sdec, t–tdec+1), D3A2($s$–sdec+1, t–tdec), and D3A2($s$–sdec+1, t–tdec+1) are all small, so that the second estimated variation quantity D3A52 obtained by interpolation also has a small value.

When there is strong correlation in the vertical direction, as in the vertical stripe pattern, for example, the first directional value D3A5$x$ should take values near '1', and the second directional value D3A5$y$ should take values near '0'. Therefore, the absolute value of the first estimated variation quantity D3A51 ought to be much larger than the absolute value of the second estimated variation quantity D3A52. But, as noted above, the absolute value of the first estimated variation quantity D3A51 may take small values, so that there is no assurance that this condition will be met. That is, when there is a vertical stripe pattern, in some cases, the first and second directional values D3A5$x$, D3A5$y$ cannot be appropriately obtained from the first and second estimated variation quantities D3A51, D3A52.

Similarly, when there is a horizontal stripe pattern, the first directional value D3A5$x$ should take values near '0' and the second directional value D3A5$y$ should take values near '1', but in some cases, appropriate values cannot be obtained from the first and second estimated variation quantities D3A51, D3A52.

When there is a vertical stripe pattern as in FIG. 7A, or when there is strong correlation in the vertical direction, the absolute values of the vertical second derivatives calculated for the pixels in low resolution image D01 will be small, but the absolute values of the horizontal second derivatives calculated for the pixels in low resolution image D01 will be fairly large. Accordingly, when there is a vertical stripe pattern near the position of interest, the result of comparison between the absolute values of the horizontal and vertical second derivatives calculated for the pixels in the neighborhood of the position of interest will indicate that there are more pixels for which the absolute value of the horizontal second derivative is larger than the absolute value of the vertical second derivative. Accordingly, the first count value D3A532N1 will be larger than the second count value D3A532N2.

When there is a horizontal stripe pattern as in FIG. 7B, or when there is strong correlation in the horizontal direction, by similar reasoning, the second count value D3A532N2 will be greater than the first count value D3A532N1.

When there is no change in pixel value, as in FIG. 7C, or when there is no particular direction of strong correlation, the absolute values of the horizontal and vertical second derivatives calculated for the pixels neighboring the position of interest are not so large, and which derivative has the larger value is a matter of chance. Accordingly, when the absolute values of the horizontal second derivatives and the absolute values of the vertical second derivatives calculated for the pixels in the neighborhood of the position of interest are compared, there will be no significant difference between the number of pixels having a vertical second derivative larger than a horizontal second derivative and the number of pixels having a horizontal second derivative larger than a vertical second derivative. Accordingly the first count value D3A532N1 and second count value D3A532N2 will be substantially the same.

Therefore, when at least one of the estimated variation quantities D3A51 and D3A52 has a small value, the first and second count values D3A532N1, D3A532N2 can be used to determine whether there is strong correlation in the vertical direction, strong correlation in the horizontal direction, or no particular direction of strong correlation.

In other words, determining whether the vertical correlation or the horizontal correlation is stronger from the magnitude relation between the first count value D3A532N1 and second count value D3A532N2 makes it possible to obtain an appropriate first directional value D3A5$x$ and second directional value D3A5$y$. If D3A532N1 is greater than D3A532N2 (D3A532N1>D3A532N2), vertical correlation is strong, so that the first directional value D3A5$x$ is set to '1' and the second directional value D3A5$y$ is set to '0'. Conversely, if D3A532N1 is less than D3A532N2 (D3A532N1<D3A532N2), horizontal correlation is strong, so that the first directional value D3A5$x$ is set to '0' and the second directional value D3A5$y$ is set to '1'. Since the interpolation coefficients D3A vary responsive to the first and second directional values D3A5$x$, D3A5$y$, appropriate determination of these directional values D3A5$x$, D3A5$y$ leads to appropriate determination of the interpolation coefficients D3A.

In addition to the method of determining the first and second directional values D3A5$x$, D3A5$y$ described above, when there is no particular direction of strong correlation, that is, when there is not much difference between the first count value D3A532N1 and second count value D3A532N2, the first direction value D3A5$x$ and the second directional value D3A5$y$ are both set to '0'. The reason, as described later, is that when there is no particular direction of strong correlation, the interpolation coefficients can be so determined that the pixels neighboring the position of interest are equally weighted.

As described above, by using the absolute value of the horizontal second derivative and the absolute value of the vertical second derivative of the changes in pixel values in low resolution image D01, the direction of strong correlation can be determined more accurately.

In the embodiment described above, the horizontal first derivative of changes in the pixel values of low resolution image D01 is used as the first variation quantity D3A1, the vertical first derivative of changes in the pixel values of low resolution image D01 is used as the second variation quantity D3A2, the absolute value of the horizontal second derivative of changes in the pixel values of low resolution image D01 is used as the third variation quantity D3A3, and the absolute value of the vertical second derivative of changes in the pixel values of low resolution image D01 is used as the fourth variation quantity D3A4. But the values used as the first to fourth variation quantities D3A1, D3A2, D3A3, D3A4 are not limited to these values.

It is only necessary for the first and third variation quantities D3A1 and D3A3, and likewise the second and fourth variation quantities D3A2 and D3A4, to have different properties, or to be derived in different ways. If the first variation quantity D3A1 and third variation quantity D3A3 have different properties, and the second variation quantity D3A2 and fourth variation quantity D3A4 have different properties, then when it is difficult to determine a direction of strong correlation from the first and second variation quantities D3A1 and D3A2, it may be possible to determine a direction of strong correlation from the third and fourth variation quantities D3A3 and D3A4 instead. That is, it is possible to determine a direction strong correlation more accurately.

The interpolation coefficients D3A will now be described.

A pixel positioned in a direction of strong correlation is considered to be a pixel with strong correlation, and is given an interpolation coefficient D3A having a greater value.

If the horizontal coordinate of the position of interest is denoted s, the vertical coordinate of the position of interest is denoted t, the first directional value D3A5$x$ at the position of interest is denoted D3A5$x$(s, t), and the second directional value D3A5$y$ is denoted D3A5$y$(s, t), then since the straight line tangent to the contour line passing through the position of interest is orthogonal to the two-dimensional vector (D3A5$x$ (s, t), D3A5$y$(s, t)), it is represented by the following equation.

$$(x-s) \times D3A5x(s,t) + (y-t) \times D3A5y(s,t) = 0 \quad (17)$$

The set of (x, y) satisfying the above equation (17) is the orthogonal line mentioned above. The distance from the position represented by horizontal coordinate p and vertical coordinate q to the straight line mentioned above can be calculated as follows:

$$\frac{|(p-s) \times D3A5x(s, t) + (q-t) \times D3A5y(s, t)|}{\sqrt{(D3A5x(s, t))^2 + (D3A5y(s, t))^2}} \quad (18)$$

Except when the first and second directional values D3A5$x$, D3A5$y$ are determined by equations (10), the value of the denominator is 1 and formula (18) matches the quantity r shown in equation (13).

In the vicinity of the position of interest, the contour line passing through the position of interest can be approximated by the straight line tangent to the contour line passing through the position of interest. The value of r given by equation (13) can accordingly be used as the approximate distance from the contour line passing through the position of interest.

Since the interpolation coefficients D3A are assigned by a function that monotonically decreases with respect to r, their values decrease with increasing distance from the contour line passing through the position of interest. Since the contour line passes through pixels with the same pixel value as the pixel at the position of interest, the correlation with the pixel of interest weakens with increasing distance from the contour line.

The interpolation coefficients D3A are accordingly calculated so as to have smaller values for pixels located in directions of weaker correlation. Conversely, they are calculated so as to have larger values for pixels located in directions of stronger correlation. This means that correlation with the pixel of interest can be taken into consideration by calculating the interpolation coefficients D3A from the first and second directional values D3A5$x$, D3A5$y$.

The above argument does not apply when the first and second directional values D3A5$x$, D3A5$y$ are determined by equations (10). But in that case the value of r is zero regardless of the values of p and q. Accordingly, the same interpolation coefficients are used for all pixels.

The first and second directional values D3A5$x$, D3A5$y$ are determined by equations (10) when there is no particular direction of strong correlation and, accordingly, the interpolation coefficients need not have larger values for pixels in a particular direction. Put differently, when there is no particular direction of strong correlation, interpolation coefficients can be so calculated that all directions are weighted equally.

As described above, when the image processing apparatus of the present invention determines the pixel value of a pixel of interest by interpolation from the pixel values of pixels in the neighborhood of the pixel of interest, the interpolation coefficients are determined according to the result of the determination of the direction of strong correlation with the pixel of interest, so that the interpolation coefficients for pixels that are more strongly correlated with the pixel of interest have greater weight. Since the interpolation operation is carried out using the interpolation coefficients determined in this way, a more accurate pixel value can be obtained for the pixel of interest.

Suppose, for example, that there is a portion such as an edge at which the luminance changes greatly near the pixel of interest. In this case, the vicinity of the pixel of interest includes an area with many low-luminance pixels and an area with many high-luminance pixels. The example below assumes that the pixel of interest belongs to the low-luminance area.

When the pixel value of the pixel of interest is determined by interpolation from the pixel values of pixels in the neighborhood of the pixel of interest, if the interpolation coefficients for the pixels neighboring the pixel of interest are determined without consideration of the strength of their correlation with the pixel of interest, pixels with high luminance and pixels with low luminance will affect the pixel value of the pixel of interest to the same extent. As a result, the pixel of interest acquires a higher pixel value than the neighboring pixels of low luminance, which appears strange.

If the interpolation coefficients for pixels neighboring the pixel of interest are determined with consideration of the strength of their correlation with the pixel of interest when the pixel value of the pixel of interest is determined by interpolation from the pixel values of the pixels positioned near the pixel of interest, the weights of pixels with high luminance will be smaller, and the weights of pixels with low luminance will be greater. Accordingly, the pixel value of the pixel of interest will be similar to the pixel values of the low luminance pixels positioned nearby, avoiding the above strange appearance.

The method of calculating correlation with the pixel of interest is not limited to the exemplary method above. In general, pixels distant from the pixel of interest are more likely to take pixel values differing from the pixel value of the pixel of interest. Therefore, in addition to being varied according to the quantity r appearing in equation (3), the interpolation coefficients may also be varied according to distance from the position of interest. For example, the interpolation coefficients may be made smaller with increasing distance from the position of interest. By taking into consideration the distance from the pixel of interest, the correlation of the pixels closer to the pixel of interest is given a greater weight, and the pixel value of the pixel of interest can be determined more appropriately.

The r appearing in equation (13) depends on (p s) and (q–t), and the f(r) in equation (14) decreases as r increases, so that the interpolation coefficients become smaller with increasing distance. Accordingly, if the interpolation coefficients are made smaller with increasing distance from the pixel of interest, as well as with increasing values of r, the distance from the pixel of interest is taken into consideration twice.

The first variation quantity D3A1 need only have a value equivalent to the first derivative of the changes in the pixel values of low resolution image D01 in the horizontal direction. Accordingly, it can be calculated by any method that approximately gives the first derivative of the changes in the pixel values of low resolution image D01 in the horizontal direction; the method is not limited to equation (3).

Similarly, the second variation quantity D3A2 need only have a value equivalent to the first derivative of the changes in the pixel values of low resolution image D01 in the vertical direction. Accordingly, it can be calculated by any method that approximately gives the first derivative of the changes in the pixel values of low resolution image D01 in the vertical direction; the method is not limited to equation (4).

The first and second variation quantities D3A1 and D3A2 in the description above were a combination of the first derivative of the changes in the pixel values of low resolution image D01 in the horizontal direction and the first derivative of the changes in the pixel values of low resolution image D01 in the vertical direction, but it is only necessary for them to be a combination of the first derivatives of the changes in pixel values in two different directions. Therefore, in general, it is only necessary for the first variation quantity D3A1 to be the first derivative of the changes in the pixel values of low resolution image D01 in a first direction and the second variation quantity D3A2 to be the first derivative of the changes in the pixel values of low resolution image D01 in a second direction The third variation quantity D3A3 need only have a value equivalent to the second derivative of the changes in the pixel values of low resolution image D01 in the horizontal direction. Accordingly, it can be calculated by any method that approximately gives the second derivative of the changes in the pixel values of low resolution image D01 in the horizontal direction; the method is not limited to equation (5).

Similarly, the fourth variation quantity D3A4 need only have a value equivalent to the second derivative of the changes in the pixel values of low resolution image D01 in the vertical direction. Accordingly, it can be calculated by any method that approximately gives the second derivative of the changes in the pixel values of low resolution image D01 in the vertical direction; the method is not limited to equation (6).

The third and fourth variation quantities D3A3 and D3A4 in the description above formed a combination of the second derivatives of the changes in the pixel values of low resolution image D01 in the horizontal and vertical directions, but it is only necessary for them to be a combination of the second derivatives of the changes in pixel values in two different directions. Moreover, the direction of the change of the third variation quantity D3A3 and the direction of the change of the fourth variation quantity D3A4 need not be identical to the direction (first direction) of the change of the first variation quantity D3A1 and the direction (second direction) of the change of the second variation quantity D3A2. Therefore, in general, it is only necessary for the third variation quantity D3A3 to be the second derivative of the changes in the pixel values of low resolution image D01 in a third direction and the fourth variation quantity D3A4 to be the second derivative of the changes in the pixel values of low resolution image D01 in a fourth direction.

The first and second variation quantities D3A1, D3A2 were obtained from the pixel values of low resolution image D01, but they may be obtained from the pixel values of low resolution image D02. The alterations that should be made to the above embodiment, for obtaining the first and second variation quantities D3A1, D3A2 from the pixel values of low resolution image D02 will be obvious to those skilled in the art.

Similarly, the third and fourth variation quantities D3A3, D3A4 were obtained from the pixel values of low resolution image D01, but they may be obtained from the pixel values of low resolution image D02. The alterations that should be made to the above embodiment for obtaining the third and fourth variation quantities D3A3, D3A4 from the pixel values of low resolution image D02 will be obvious to those skilled in the art.

In the embodiment described above, two low resolution images (D01, D02) were combined to output a single high resolution image, but the number of low resolution images that are combined is not limited to two.

That is, the image processing device according to the present invention generates a high resolution image (D30) from first to N-th low resolution images (D01 to D0N, where N is an integer equal to or greater than two);

the positional offset calculator 10 calculates a positional offset D10 between the first low resolution image and each J-th low resolution image (where J is an integer ranging from two to N);

the combiner 20 obtains a combined pixel array D20A in which pixel values of pixels in the first to N-th low resolution images are assigned to pixels arrayed on a common plane on the basis of their positional offsets D10, and obtains valid pixel flag data D20B indicating whether or not each pixel on the common plane has been assigned a pixel value from the first to N-th low resolution images; and the pixel value calculator 30 obtains a pixel value of each pixel in the high resolution image by interpolation operation based on the pixel values of the pixels in the combined pixel array, using, for each pixel of interest set on the common plane, pixel values of pixels in an area of interest set to include the pixel of interest.

The interpolation coefficient calculator 3A in the pixel value calculator 30 obtains interpolation coefficients D3A for the pixels in the area of interest, such that the pixels that are more strongly correlated with the pixel of interest are given the interpolation coefficients of greater values.

The interpolation coefficients D3A may be obtained from any one of the first to N-th low resolution images by the method described in relation to the interpolation coefficient calculator 3A in the above embodiment.

Second Embodiment

Figure 8:
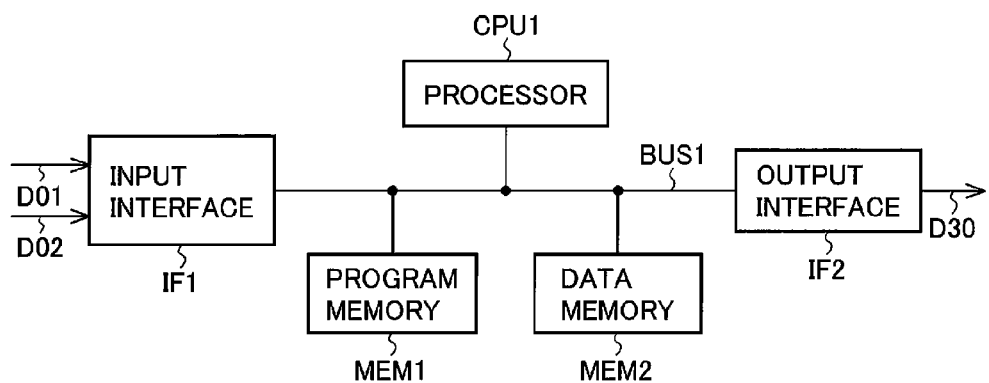
FIG. 8 is a block diagram of a computing device for carrying out an image processing method according to a second embodiment of the invention.

FIG. 8 is a block diagram of a computing device for carrying out an image processing method according to a second embodiment of the invention. In this image processing method, two low resolution images D01 and D02 are combined to generate a single high resolution image D30.

The computing device for carrying out the image processing method includes an input interface IF1, an output interface IF2, a processor CPU1, a program memory MEM1, and a data memory MEM2, and a data bus BUS1 by which the foregoing components are interconnected.

The processor CPU1 operates according to a program stored in the program memory MEM1, generating various types of data, some of which are stored in the data memory MEM2. The low resolution images D01 and D02 are input to the computing device via the input interface IF1. The high resolution image D03 generated by the image processing method according to the invention is output externally through the output interface IF2.

Figure 9:
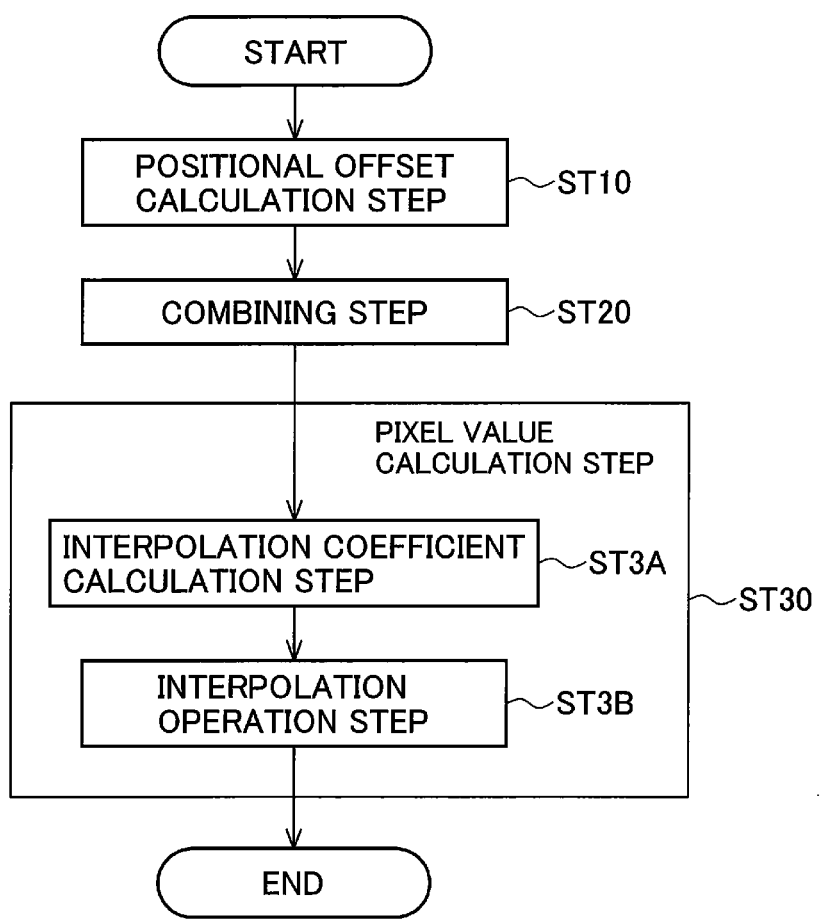
FIG. 9 is a flowchart illustrating a processing procedure in the image processing method according to a second embodiment of the invention.

FIG. 9 illustrates a processing procedure in the image processing method according to the invention. The image processing method according to the invention includes a positional offset calculation step ST10, a combining step ST20, and a pixel value calculation step ST30.

The positional offset calculation step ST10 calculates the positional offset of low resolution image D02 with respect to low resolution image D01 by the same process as used by the positional offset calculator 10 described in the first embodiment, and outputs the calculated result as a positional offset D10.

The combining step ST20 outputs a combined pixel array D20A and valid pixel flag data D20B obtained as a result of combining low resolution images D01 and D02 on the basis of the positional offset D10 by the same process as used by the combiner 20 described in the first embodiment.

The pixel value calculation step ST30 includes an interpolation coefficient calculation step ST3A and an interpolation operation step ST3B.

The interpolation coefficient calculation step ST3A will now be described.

Figure 10:
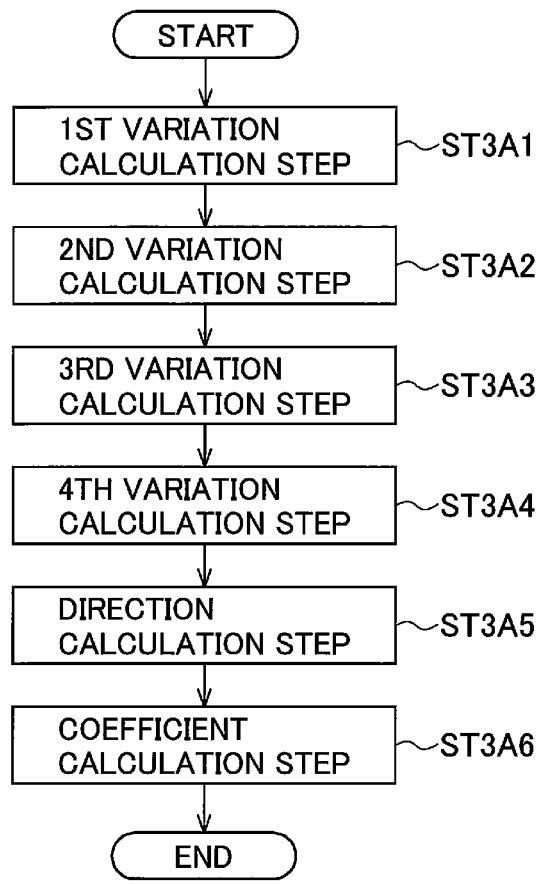
FIG. 10 is a flowchart illustrating the processing procedure in the interpolation coefficient calculation step ST3A in FIG. 9.

FIG. 10 illustrates the processing procedure in the interpolation coefficient calculation step ST3A. The interpolation coefficient calculation step ST3A includes a first variation calculation step ST3A1, a second variation calculation step ST3A2, a third variation calculation step ST3A3, a fourth variation calculation step ST3A4, a direction calculation step ST3A5, and a coefficient calculation step ST3A6.

The first variation calculation step ST3A1 calculates, for each pixel in low resolution image D01, a first derivative of related pixel values in the horizontal direction by the same process as used by the first variation calculator 3A1 described in the first embodiment, obtaining first variation quantities D3A1.

The second variation calculation step ST3A2 calculates, for each pixel in low resolution image D01, a first derivative of related pixel values in the vertical direction by the same process as used by the second variation calculator 3A2 described in the first embodiment, obtaining second variation quantities D3A2.

The third variation calculation step ST3A3 calculates, for each pixel in low resolution image D01, a second derivative of related pixel values in the horizontal direction by the same process as used by the third variation calculator 3A3 described in the first embodiment, obtaining third variation quantities D3A3.

The fourth variation calculation step ST3A4 calculates, for each pixel in low resolution image D01, a second derivative of related pixel values in the vertical direction by the same process as used by the fourth variation calculator 3A4 described in the first embodiment, obtaining fourth variation quantities D3A4.

The direction calculation step ST3A5 will now be described with reference to FIG. 11.

Figure 11:
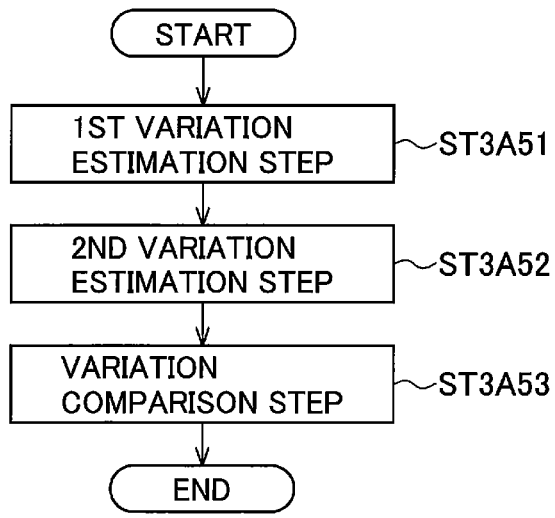
FIG. 11 is a flowchart illustrating the processing procedure in the direction calculation step ST3A5 in FIG. 10.

FIG. 11 illustrates the processing procedure in the direction calculation step ST3A5. The direction calculation step ST3A5 includes a first variation estimation step ST3A51, a second variation estimation step ST3A52, and a variation comparison step ST3A53.

The first variation estimation step ST3A51 calculates a first estimated variation quantity D3A51 by the same process as used by the first variation estimator 3A51 described in the first embodiment.

The second variation estimation step ST3A52 calculates a second estimated variation quantity D3A52 by the same process as used by the second variation estimator 3A52 described in the first embodiment.

The variation comparison step ST3A53 will be described with reference to FIG. 12.

Figure 12:
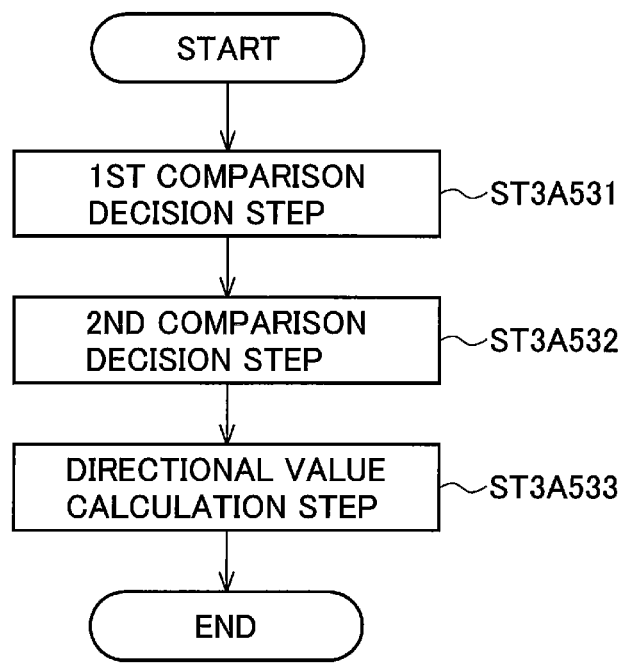
FIG. 12 is a flowchart illustrating the processing procedure in the variation comparison step ST3A53 in FIG. 11.

FIG. 12 illustrates the processing procedure in the variation comparison step ST3A53. The variation comparison step ST3A53 includes a first comparison decision step ST3A531, a second comparison decision step ST3A532, and a directional value calculation step ST3A533.

The first comparison decision step ST3A531 determines a first comparison result D3A531 by the same process as used by the first comparison decision unit 3A531 described in the first embodiment.

The second comparison decision step ST3A532 determines a second comparison result D3A532 including a first count value D3A532N1 and a second count value D3A532N2 by the same process as used by the second comparison decision unit 3A532 described in the first embodiment.

The directional value calculation step ST3A533 calculates directional data D3A5 by the same process as used by the directional value calculator 3A533 described in the first embodiment.

The processing in the variation comparison step ST3A53, described above, is the same as the processing carried out in the variation comparator 3A53 described in the first embodiment.

The processing in the direction calculation step ST3A5, described above, is the same as the processing carried out in the direction calculator 3A5 described in the first embodiment.

The coefficient calculation step ST3A6 calculates interpolation coefficients D3A by the same process as used in the coefficient calculator 3A6 described in the first embodiment.

The processing in the interpolation coefficient calculation step ST3A, described above, is the same as the processing carried out in the interpolation coefficient calculator 3A described in the first embodiment.

The interpolation operation step ST3B will now be described.

The interpolation operation step ST3B calculates the value of each pixel of the high resolution image D30 by the same process as used in the interpolation operation unit 3B described in the first embodiment.

The processing in the image processing method according to the second embodiment is as described above. The image processing method of the invention is capable of carrying out the same processing as the image processing apparatus in the first embodiment of the invention, so that it produces the same effects. The variations of the image processing apparatus described in the first embodiment of the invention are also applicable to the image processing method according to the second embodiment.

Those skilled in the art will recognize that further variations are possible within the scope of the invention, which is defined in the appended claims.

What is claimed is:

1. An image processing device for generating a high resolution image from first to N-th low resolution images, where N is an integer equal to or greater than two, the image processing device comprising:

a positional offset calculator for calculating a positional offset between the first low resolution image and each J-th low resolution image, where J is an integer ranging from two to N;

a combiner for obtaining a combined pixel array in which pixel values of pixels in the first to N-th low resolution images are assigned to pixels arrayed on a common plane on the basis of the positional offsets, and obtaining valid pixel flag data indicating whether or not each pixel on the common plane has been assigned a pixel value from the first to N-th low resolution images; and a pixel value calculator for obtaining a pixel value of each pixel in the high resolution image from an interpolation operation based on the pixel values of the pixels in the combined pixel array, using, for each pixel of interest set on the common plane, pixel values of pixels in an area of interest set to include the pixel of interest;

wherein the pixel value calculator includes an interpolation coefficient calculator for obtaining, for the pixels in the area of interest, interpolation coefficients with values that increase with increasingly strong correlation with the pixel of interest; and an interpolation operation unit for performing the interpolation operation by using the interpolation coefficients and the pixel values of the pixels in the area of interest.

2. The image processing device of claim 1, wherein the interpolation coefficient calculator finds a direction of strong correlation from one of the first to N-th low resolution images and treats the pixels located in the direction of strong correlation as pixels with strong correlations.

3. The image processing device of claim 2, wherein the interpolation coefficient calculator comprises:
a first variation calculator for calculating, for each pixel in the one of the first to N-th low resolution images, a first variation quantity pertaining to a first direction centered on said each pixel;
a second variation calculator for calculating, for each pixel in the one of the first to N-th low resolution images, a second variation quantity pertaining to a second direction centered on said each pixel;
a direction calculator for obtaining, from the first and second variation quantities, directional data representing the direction of strong correlation; and
a coefficient calculator for calculating the correlation coefficients from the directional data.

4. The image processing device of claim 3, wherein the direction calculator finds the direction of strong correlation by using:
a first interpolated variation quantity obtained by interpolation from the first variation quantity; and
a second interpolated variation quantity obtained by interpolation from the second variation quantity.

5. The image processing device of claim 4, wherein:
the first direction is a horizontal direction;
the first variation quantity is obtained by taking a first derivative, in the horizontal direction, of variations in pixel values centered on said each pixel in the one of the first to N-th low resolution images;
the second direction is a vertical direction; and
the second variation quantity is obtained by taking a first derivative, in the vertical direction, of variations in pixel values centered on said each pixel in the one of the first to N-th low resolution images.

6. The image processing device of claim 3, wherein the interpolation coefficient calculator further comprises:
a third variation calculator for calculating, for each pixel in the one of the first to N-th low resolution images, a third variation quantity pertaining to a third direction centered on said each pixel; and
a fourth variation calculator for calculating, for each pixel in the one of the first to N-th low resolution images, a fourth variation quantity pertaining to a fourth direction centered on said each pixel; and wherein
the direction calculator finds the direction of strong correlation from the first to fourth variation quantities.

7. The image processing device of claim 6, wherein
the third direction is the horizontal direction;
the third variation quantity is obtained by taking an absolute value of a second derivative, in the horizontal direction, of variations in pixel values centered on said each pixel in the one of the first to N-th low resolution images;
the fourth direction is the vertical direction; and
the fourth variation quantity is obtained by taking an absolute value of a second derivative, in the vertical direction, of variations in pixel values centered on said each pixel in the one of the first to N-th low resolution images.

8. The image processing device of claim 7, wherein the direction calculator determines the direction of strong correlation from the third variation quantity and the fourth variation quantity when an absolute value of the first interpolated variation quantity is equal to or less than a first threshold value or an absolute value of the second interpolated variation quantity is equal to or less than a second threshold value.

9. The image processing device of claim 8, wherein if, as a result of comparison of an absolute value of the third variation quantity with an absolute value of the fourth variation quantity for each pixel in the one of the first to N-th low resolution images in a vicinity of the pixel of interest, there have been found more pixels for which the absolute value of the fourth variation quantity is greater than the absolute value of the third variation quantity, the direction calculator selects the third direction as the direction of strong correlation; while if there have been found more pixels for which the absolute value of the third variation quantity is greater than the absolute value of the fourth variation quantity, the direction calculator selects the fourth direction as the direction of strong correlation.

10. The image processing device of claim 8, wherein the direction calculator decides that there is no direction of strong correlation when a difference between the number of pixels for which the absolute value of the fourth variation quantity is greater than the absolute value of the third variation quantity and the number of pixels for which the absolute value of the third variation quantity is greater than the absolute value of the fourth variation quantity is found to be less than a third threshold value, as a result of said comparison.

11. The image processing device of claim 3, wherein the coefficient calculator calculates the correlation coefficients for the pixels in the area of interest on a basis of distances between the pixels in the area of interest and the pixel of interest; and the directional data.

12. An image processing method for generating a high resolution image from first to N-th low resolution images, where N is an integer equal to or greater than two, the image processing method comprising:
a positional offset calculation step for calculating a positional offset between the first low resolution image and each J-th low resolution image, where J is an integer ranging from two to N;
a combining step for obtaining a combined pixel array in which pixel values of pixels in the first to N-th low resolution images are assigned to pixels arrayed on a common plane on the basis of the positional offsets, and obtaining valid pixel flag data indicating whether or not each pixel on the common plane has been assigned a pixel value from the first to N-th low resolution images; and
a pixel value calculation step for obtaining a pixel value of each pixel in the high resolution image from an interpolation operation based on the pixel values of the pixels in the combined pixel array, using, for each pixel of interest set on the common plane, pixel values of pixels in an area of interest set to include the pixel of interest;
wherein the pixel value calculation step includes
an interpolation coefficient calculation step for obtaining, for the pixels in the area of interest, interpolation coefficients with values that increase with increasingly strong correlation with the pixel of interest; and
an interpolation operation step for performing the interpolation operation by using the interpolation coefficients and the pixel values of the pixels in the area of interest.

* * * * *